: 3,749,769
NAIL LACQUER COMPOSITIONS AND PROCESS FOR THE PREPARATION THEREOF

Iwakichi Sugiyama, Narashino, and Haruki Tomozuka, Tokyo, Japan, assignors to Matsumoto Chemical Industry Co., Ltd., Ichikawa-shi, Chiba-ken, Japan
No Drawing. Continuation of abandoned application Ser. No. 753,745, Aug. 19, 1968. This application Jan. 22, 1971, Ser. No. 108,971
Claims priority, application Japan, Feb. 1, 1968, 43/5,832
Int. Cl. A61k 7/04
U.S. Cl. 424—61                 5 Claims

ABSTRACT OF THE DISCLOSURE

A nail lacquer having a good water-proofness, adhesiveness and luster is obtained by polymerizing acrylic monomers in a solvent having a relatively large chain-transfer constant to form oligomers or co-oligomers, and blending the obtained oligomers or co-oligomers with a nitrocellulose lacquer in the amount of 30–65% based on the solid content of the nitrocellulose lacquer.

This application is a continuation application of Ser. No. 753,745, Aug. 19, 1968, now abandoned.

BACKGROUND OF THE INVENTION

This invention relates to a nail lacquer having a good water-proofness, adhesiveness and luster.

Generally, nail lacquers are prepared from nitrocellulose, natural or synthetic resins and liquid plasticizers. Because the nitrocellulose has a high glass transition point and cannot by itself form a tough film, it is necessary to plasticize it with a plasticizer. Nitrocellulose and a liquid plasticizer give a tough film to a certain extent, but such film does not prove to be satisfactory in respect of luster, beautiful appearance and brush coating properties.

To remedy these defects, attempts are being made to incorporate therein natural and synthetic resins. Natural resins had been preferably used for this purpose up to several years ago. Since then, many synthetic resins were prepared, and it is these synthetic resins that are blended with ordinary nitrocellulose lacquers. It is impossible however to incorporate into a nail lacquer a resin such as used generally in the paint industry, because most of synthetic resins that will give desirable properties when blended with nitrocellulose are either formalin type resins or resins undesirable for nail lacquers. These resins connot be used for nail lacquers.

Synthetic resins most generally used now in the art are alkylbenzenesulfonic acid amide/formalin resins. It is said that these resins hardly liberate formalin, but it is doubtful if they will not liberate it at all. Furthermore, these resins must be used together with liquid plasticizers. However, liquid plasticizers generally deteriorate the water-proofness of nail lacquers, and weaken the adhesive power by moving to a surface to which the lacquer adheres. These defects are the causes of exfoliation of a nail enamel from nails, reduction in luster, and therefore a considerable deterioration in beauty.

With these problems in mind, the invention provides new nail lacquer compositions and a process for their preparation, which comprises blending, with nitrocellulose lacquers. oligomers or co-oligomers of acrylic esters which act concurrently as a resin and a plasticizer, without any positive necessity of such liquid plasticizers. Such oligomers and co-oligomers are low-molecular-weight polymers which never separate formalin, nor cause a problem in respect of toxicity. Moreover, they impart good properties such as water-proofness, adhesiveness and luster to nitrocellulose lacquers.

DETAILED DESCRIPTION

The oligomers and co-oligomers of acrylic esters used in the invention can be prepared by polymerizing acrylic ester monomers in the medium of a great quantity of the solvent having a relatively large chain-transfer constant. Such solvents, include, for instance, methyl isobutyl ketone, methyl ethyl ketone, isobutyl alcohol, isopropyl alcohol, sec. butyl alcohol, and toluene. These solvents are used in amounts of 4–20 moles, preferably 6–15 moles, per mole of the acrylic ester monomers.

As mentioned above, the oligomers or co-oligomers used in the invention can be synthesized with the use of generally known solvents having a large chain-transfer constant. But it is necessary to make the molar ratio of solvent to monomer considerably large, and yet the yield of the intended oligomer is very low. This is a serious problem in the commercial practice of the process.

The present invention also includes a process wherein the above problem is solved by using lactic ester as the solvent having a large chain-transfer constant.

Useful solvents having a large chain-transfer constant to be used in the invention are lactic acid esters of the alcohols having an alkyl or cycloalkyl group, such as methyl lactate, ethyl lactate, propyl lactate and butyl lactate. The alkyl or cycloalkyl group may, substantially, have more than 6 carbon atoms, but should preferably have not more than 6 carbon atoms in view of the recovery of solvents.

Such a lactic ester is used in an amount of 0.5–8 moles, preferably 1.0–4.0 moles, per mole of the acrylic ester monomer to obtain the desired oligomer or co-oligomer.

The acrylic ester monomers of the invention are expressed by the following formula:

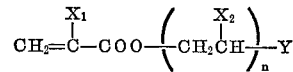

wherein each of $X_1$ and $X_2$ represents a hydrogen atom or a methyl group; $n$ is 0 or 1; when $n$ is 0, Y represents an alkyl of 1–10 carbon atoms, benzyl or cycloalkyl of up to 10 carbon atoms; when $n$ is 1, Y represents $OR_1$,

or a hydroxyl group, where $R_1$ is an alkyl or cycloalkyl group having not more than 10 carbon atoms, and $R_2$ and $R_3$ may be the same or different, and each represents an alkyl group having not more than 4 carbon atoms.

The acrylic ester can be used also in the form of a mixture containing at least 2 mole percent of an acid expressed by the above formula wherein $n$ is O and Y is a hydrogen atom. The above acrylic ester monomers may be used either alone or in mixtures with each other. (However, methacrylic esters should always be used together with acrylic esters, in an amount not exceeding 30 mole percent.)

Specific examples of such monomers are alkyl acrylates such as n-butyl acrylate, cycloalkyl acrylates, benzyl acrylate, alkyl methacrylates, benzyl methacrylate, alkylcellosolve acrylates, propylene glycol monoalkylether acrylates, alkylcellosolve methacrylates, and propylene glycol monoalkyl ether methacrylates.

The polymerization reaction can be carried out at 60–180° C. in a stream of nitrogen gas with the use of an ordinary polymerization vessel provided with a stirrer, a reflux column, a thermometer, a monomer dropping device and a nitrogen gas introducing tube. Preferably, the reaction temperature should be between the boiling point of the used solvent and a point slightly lower than it. The reaction is initiated by a polymerization initiator. Ordinary initiators which are in the general use can be employed, but especally preferred are the initiators of dialkyl type such as di-tertiary butyl peroxide and the initiators of perester type such as tertiary-butyl peracetate which have a high proton-accepting power. It is because of a high hydrogen abstracting ability and difficulty of subjecting to induced decomposition that these initiators are preferred. The amount of the initiator may be at least 0.1% based on the monomer, but usually an amount of about 1% is sufficient.

An oligomer or co-oligomer synthesized in this manner is, after the end of the reaction, incorporated into a nail lacquer, unless there are inconveniences. "No inconvenience expressed here means that the resulting nail lacquer contains only negligible amounts of unreacted monomer having toxicity and residual peroxide which is detrimental to the stability of the lacquer, and the solvent used in the reaction does not cause any inconvenience even when present in the nail lacquer. In general, however, such a suitable means as a distillation under reduced pressure, distillation under normal atmospheric pressure or azeotropic distillation is employed to recover the solvent used in the reaction and remove the unreacted monomer and residual initiator to a concentration such as will not cause troubles, and the lacquer is diluted with other suitable solvent to a predetermined concentration. Or such oligomer or co-oligomer is blended with nitrocellulose in a completely resinous form.

The low-molecular-weight polymer usable in the invention is a polymer which exhibits a viscosity of about 12–1000 centistokes measured with respect to its 75% toluene solution at 25° C. It is incorporated into a nitrocellulose lacquer in an amount of 30–65% based on the solid content of the nitrocellulose lacquer.

The following examples are presented to illustrate the invention, but not intended to be limitative. Unless otherwise specified, all parts in the following example are the parts by weight.

Example 1

An ordinary reaction apparatus provided with a thermometer, a stirrer, a reflux column, a monomer dropping device and a gas blowing tube was charged with 19.2 parts of n-butyl acrylate, 172.3 parts of sec. butanol and 1 part of tert. butyl peracetate (75% solution), and heated to 100° C. in a stream of nitrogen gas. A mixture of 38.3 parts of n-butyl acrylate, 6.5 parts of 2-hydroxyethyl methacrylate and 50 parts of sec. butanol was added dropwise over a period of 3 hours, and the reaction was continued for 5 hours at the same temperature. After the 8-hour reaction, the solvent was evaporated under reduced pressure, followed by diluting the reaction product with toluene to reduce the solid content to 75%. A 75% solution of the product in toluene exhibited a viscosity of about 340 centistokes at 25° C. This solution was negative against Tollens reagent, and no aldehyde was detected therefrom. Fifty to sixty parts of this resin was blended with 50 parts of nitrocellulose.

Example 2

The same reaction apparatus as used in Example 1 was charged with 19.5 parts of n-butyl acrylate, 97.5 parts of ethyl lactate and 1 part of di-tertiary butyl peroxide (97% solution). While the temperature was being maintained at 140–145° C. in a stream of nitrogen, a mixture of 6.5 parts of 2-hydroxyethyl methacrylate, 50 parts of ethyl lactate and 38 parts of n-butyl acrylate was added dropwise over a period of 3 hours, and the reaction was continued for further 5 hours at the same temperature. In the same manner as in Example 1, a 75% toluene solution of the reaction product was prepared. This resin solution exhibited a viscosity of about 65 centistokes at 25° C., and was negative against Tollens reagent. Fifty to sixty parts of this resin were blended with 50 parts of nitrocellulose.

Example 3

The same reaction apparatus as used in Example 1 was charged with 49.1 parts of ethyl lactate and part of di-tertiary butyl peroxide (97%). While the temperature was being maintained at 140–150° C., 57.5 parts of n-butyl acrylate was added dropwise in a stream of nitrogen over a period of 3 hours, and the reaction was continued for further 5 hours at the same temperature. In the same manner as in Example 1, a 75% toluene solution of the reaction product was prepared. This resin solution exhibited a viscosity of about 100 centistokes at 25° C., and was negative against Tollens reagent. Fifty to sixty parts of this resin were blended with 50 parts of nitrocellulose.

Example 4

The same reaction apparatus as used in Example 1 was charged with 68 parts of ethyl lactate, 19.6 parts of n-butyl acrylate and 1 part of di-tertiary butyl peroxide. While the temperature was being maintained at 140–150° C., a mixture of 38.0 parts of n-butyl acrylate, 50 parts of ethyl lactate and 7.21 parts of 2-butoxyethyl acrylate was added dropwise in a stream of nitrogen over a period of 3 hours, and the reaction was continued for further 5 hours at the same temperature. A 75% toluene solution of the product was prepared in the same manner as in Example 1. This solution of the product exhibited a viscosity of about 50 centistokes at 25° C. Forty to sixty parts of this resin were blended with 50 parts of nitrocellulose.

Example 5

The same reaction apparatus as used in Example 1 was charged with 32 parts of n-butyl acrylate, 236 parts of ethyl lactate and 1.5 parts of di-tert-butyl peroxide. While the temperature was being maintained at 140–145° C., a mixture of 96 parts of n-butyl acrylate and 0.5 part of t-butyl peracetate was added dropwise in a stream of nitrogen over a period of 3 hours, and the reaction was continued for further 7 hours at the same temperature. In the same manner as in Example 1, the ethyl lactate was recovered under reduced pressure. Subsequently, under normal atmospheric pressure, toluene was added and the residues such as ethyl lactate were removed by the azeotropic distillation. A 75% toluene solution of the reaction product was prepared in the same manner as in Example 1. This resin solution exhibited a viscosity of about 50 centistokes at 25° C. Forty to sixty parts of this resin was blended with 50 parts of nitrocellulose.

Example 6

The same reaction apparatus as used in Example 1 was charged with 62 parts of 2-ethylhexyl acrylate, 50 parts of ethyl lactate and 1 part of di-tert.-butyl peroxide, and heated to 140–145° C. while introducing nitrogen gas. A mixture of 31 parts of 2-ethylhexyl acrylate and 68 parts of ethyl lactate was added dropwise over a period of 3 hours, and the reaction was continued for further 7 hours. A 75% toluene solution of the reaction product exhibited a viscosity of about 50 centistokes at 25° C. Forty to fifty parts of this resin were blended with 50 parts of nitrocellulose.

Example 7

The same reaction apparatus as used in Example 1 was charged with 38 parts of n-butyl acrylate, 50 parts of ethyl lactate, 8.1 parts of benzyl acrylate and 1 part of di-tert.-butyl peroxide, and heated to 140–145° C. in a stream of nitrogen. A mixture of 19.6 parts of n-butyl lactate and 68 parts of ethyl lactate was added dropwise over a period of 3 hours, and the reaction was continued for further 5 hours. A 75% toluene solution of the reaction product exhibited a viscosity of about 50 centistokes at 25° C. Fifty to sixty parts of this resin were blended with 50 parts of nitrocellulose.

Example 8

The same reaction apparatus as used in Example 1 was charged with 118 parts of ethyl lactate, 46.5 parts of 2 - ethylhexyl acrylate and 1 part of di - tert. - butyl peroxide, and heated to 140–145° C. while introducing nitrogen gas, followed by adding 32 parts of n-butyl acrylate dropwise over a period of 3 hours. A 75% toluene solution of the resulting resin exhibited a viscosity of about 50 centistokes at 25° C.

Example 9

Typical formulations of the resins obtained in Examples 2–5 are shown below.

(a)

| | Percent |
|---|---|
| N-butyl acetate | 32.6 |
| Ethyl acetate | 10.6 |
| Acetone | 3.6 |
| N-butanol | 0.6 |
| Toluene | 12.0 |
| Resin of Example 2 (75% solution) | 21.4 |
| Nitrocellulose RS ¼ second | 19.2 |

(b)

| | Percent |
|---|---|
| N-butyl acetate | 26.0 |
| Ethyl acetate | 20.0 |
| Acetone | 4.0 |
| Toluene | 10.0 |
| Resin of Example 3 (75% solution) | 20.0 |
| Nitrocellulose RS ¼ second | 20.0 |

(c)

| | Percent |
|---|---|
| N-butyl acetate | 26.0 |
| Ethyl acetate | 15.0 |
| Acetone | 4.0 |
| Toluene | 10.0 |
| Ethanol | 5.0 |
| Resin of Example 4 (75% solution) | 21.6 |
| Nitrocellulose RS ¼ sec., 75% | 18.4 |

(d)

| | Percent |
|---|---|
| N-butyl acetate | 26 |
| Ethyl acetate | 12.2 |
| Acetone | 5.0 |
| Ethanol | 5.0 |
| Toluene | 8.0 |
| Xylene | 4.0 |
| Camphor | 0.6 |
| Nitrocellulose | 21.2 |
| 75% solution of resin of Example 5 | 18.0 |

Films formed from the blends of Examples 9(a), 9(b), 9(c) and 9(d) are excellent in water-proofness (this is a very important property, and a poor water-proofness results in the deterioration of luster and adhesive power, and causes exfoliation of the film from nails), adhesiveness and luster. Comparison of these films with a film of a commercially available nail lacquer. The composition used for comparison contains in weight percent 15% of nitrocellulose of 11.5%–12.2% of nitrogen content; 7.5% of toluenesulfonamide methylol compound, commercially known as Santilit; 3.75% of dibutyl phthalate; 29.35% butyl acetate; 6.40% ethyl alcohol; 1.10% butyl alcohol and 36.90% of toluene is shown in Table 1 below. The water-proofness was determined by immersing a film specimen, which had been obtained by coating the lacquer on a glass plate with a 4-mil doctor blade and drying it for 3 hours at room temperature, in city water for 24 hours. The adhesive power for a nylon plate and a plate made of buffalo horn was evaluated by the degree of adhesiveness of a lacquer film lined with a nylon gauze (dried for 24 hours) to a nylon plate or a buffalo horn plate having a size of 2 cm. x 10 cm. The pulling rate was 500 mm./min., and an angle of pulling was 180° C.

TABLE 1

| Property | Luster | Adhesive power for a nylon plate (kg./cm.²) | Water-proofness |
|---|---|---|---|
| Commercially[1] available nail lacquer. | Good | 0.7 | Whitened. |
| Example 9-(a) | do | 1.52 | Not whitened. |
| Example 9-(b) | do | 0.81 | Do. |
| Example 9-(c) | do | 1.18 | Do. |

TABLE 2

| Property | Luster | Adhesive power for a buffalo horn plate (kg./cm.²) | Water-proofness |
|---|---|---|---|
| Example 9-(d) | Good | 2.26 | Not whitened. |
| Commercially[1] available nail lacquer. | do | 1.56 | |

[1] The commercially available composition discussed in detail hereinabove.

It is extremely difficult to measure the adhesive power of a lacquer to human nails directly, and no appropriate method exists. According to John A. Peirano (Americal Perfume and Cosmetics, vol. 80, December 1965), the adhesive power for a glass plate corresponds to that for human nails. Although there is some doubt to suppose from that the adhesiveness to human nails to a nylon plate, it is believed that because of close similarity of the chemical and physical structure of nylon to human nails, the adhesiveness to a nylon plate corresponds better to that to human nails than the adhesiveness to a glass plate. Table 2 above shows the adhesiveness of the nail lacquers to a plate made of a buffalo horn, and it is believed that it may constitutes a better match with human nails.

What is claimed is:

1. A nail lacquer composition consisting essentially of:
   (A) 13.5% to 16.2% of an oligomer or co-oligomer having a viscosity of 12 to 1000 centistokes in a 75% toluene solution at 25° C., wherein said oligomer is the polymerization product of a monomer selected from the group consisting of n-butyl acrylate and 2-ethylhexyl acrylate and said co-oligomer is selected from the group consisting of the polymerization product (a) 57.6 parts n-butyl acrylate and 7.21 parts 2-butoxyethyl acrylate, (b) 38 parts n-butyl acrylate and 8.1 parts benzyl acrylate, (c) 46.5 parts 2-ethylhexyl acrylate and 32 parts n-butyl acrylate and (d) n-butyl acrylate and 2-hydroxy ethyl methacrylate, provided that said methacrylate is not in excess of 30 moles percent with respect to said acrylate;
   (B) 18.4% to 21.2% nitrocellulose; and
   (C) about 65% of a solvent consisting of a mixture of toluene, ethyl acetate, n-butyl acetate and acetone.

2. The composition according to claim 1, wherein the viscosity of said oligomer or co-oligomer in a 75% solution in toluene at 25° C., is between 50 and 340 centistokes.

3. The composition according to claim 1 wherein the solvent of component (c) additionally comprises xylene, butanol, ethanol or a mixture thereof.

4. The composition according to claim 1 wherein said co-oligomer is the polymerization product of n-butyl acrylate and 2-hydroxyethyl methacrylate having a viscosity in a 75% toluene solution of 65 centistokes at 25° C.

5. The composition of claim 1 wherein the oligomer is the polymerization product of n-butyl acrylate having a viscosity of 50 centistokes in a 75% toluene solution at 25° C.

(References on following page)

References Cited

UNITED STATES PATENTS

| | | | |
|---|---|---|---|
| 3,422,185 | 1/1969 | Kuritzkes | 424—61 |
| 3,574,822 | 4/1971 | Sheperd et al. | 424—61 |
| 3,483,289 | 12/1969 | Michaelson et al. | 424—61 |

FOREIGN PATENTS

| | | | |
|---|---|---|---|
| 48,063 | 1/1902 | Poland | 424—61 |
| 75,599 | 10/1961 | France | 424—61 |
| 1,032,367 | 6/1966 | Great Britain | 424—61 |

OTHER REFERENCES

Chemical Abstracts (I), vol. 54, 8147(b).
Chemical Abstracts (II), vol. 58, 1302(a).
Chemical Abstracts (III), vol. 61, 13124(c).
Chemical Abstracts (IV), vol. 65, 5676(b).

ALBERT T. MEYERS, Primary Examiner

N. A. DREZIN, Assistant Examiner

U.S. Cl. X.R.

424—81